(12) United States Patent
Jeong et al.

(10) Patent No.: US 8,436,820 B2
(45) Date of Patent: May 7, 2013

(54) TOUCHPAD USING RESISTIVE ELECTRO-CONDUCTIVE FIBER AND INPUT DEVICE HAVING THE SAME

(75) Inventors: Ji Wook Jeong, Daejeon (KR); Seung Hwan Kim, Daejeon (KR); Soun Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 639 days.

(21) Appl. No.: 12/615,391

(22) Filed: Nov. 10, 2009

(65) Prior Publication Data

US 2010/0141576 A1    Jun. 10, 2010

(30) Foreign Application Priority Data

Dec. 4, 2008  (KR) .................. 10-2008-0122270
Apr. 14, 2009 (KR) .................. 10-2009-0032258

(51) Int. Cl.
*G09G 5/00* (2006.01)
(52) U.S. Cl.
USPC .............. 345/173; 345/157; 702/41; 338/2
(58) Field of Classification Search ........... 345/156–176
See application file for complete search history.

(56) References Cited

U.S. PATENT DOCUMENTS

| | | | |
|---|---|---|---|
| 5,790,105 A | 8/1998 | Yoshikawa | |
| 5,915,285 A | 6/1999 | Sommer | |
| 2002/0180578 A1 | 12/2002 | Sandbach | |
| 2003/0037966 A1 | 2/2003 | Sandbach | |
| 2003/0067449 A1 * | 4/2003 | Yoshikawa et al. | 345/173 |
| 2004/0164968 A1 * | 8/2004 | Miyamoto | 345/173 |
| 2005/0156906 A1 | 7/2005 | Chiu et al. | |
| 2007/0080773 A1 | 4/2007 | Tang et al. | |
| 2007/0100523 A1 | 5/2007 | Trachte | |
| 2007/0171024 A1 * | 7/2007 | Yang et al. | 338/2 |
| 2007/0205625 A1 | 9/2007 | Lai et al. | |
| 2007/0222767 A1 | 9/2007 | Wang | |
| 2008/0018621 A1 | 1/2008 | Vincent et al. | |
| 2008/0117184 A1 * | 5/2008 | Gettemy | 345/173 |
| 2009/0021380 A1 | 1/2009 | Higuchi et al. | |
| 2010/0049450 A1 * | 2/2010 | Nagakubo et al. | 702/41 |

FOREIGN PATENT DOCUMENTS

| | | |
|---|---|---|
| DE | 10 2006 029 513 A1 | 7/2007 |
| DE | 10 2006 013 661 A1 | 10/2007 |
| JP | 54-51425 A | 4/1979 |
| JP | 61-075917 A | 4/1986 |
| JP | 62-76601 A | 4/1987 |

(Continued)

*Primary Examiner* — Alexander Eisen
*Assistant Examiner* — Amit Chatly

(57) ABSTRACT

There are provided a touchpad using resistive electro-conductive fibers and an input device having the same, which can be used for controlling a personal terminal such as a computer by receiving a user's input using a signal representing a motion of the user detected by the resistive electro-conductive fiber in contact with the user's body part such as a finger, instead of using a separate input device such as a mouse. The touchpad includes a plurality of motion detectors and a signal analyzer. The motion detectors each include a resistive electro-conductive fiber having a resistance value varied according to a change in length caused by contact with a human body part, and a signal generator outputting a signal corresponding to the varied resistance value. The signal analyzer analyzes the signal from each of the motion detectors, and generates a motion signal representing a motion of the human body part in contact with the touchpad.

13 Claims, 6 Drawing Sheets

FOREIGN PATENT DOCUMENTS

| | | |
|---|---|---|
| JP | 62-76602 A | 4/1987 |
| JP | 2-63133 U | 5/1990 |
| JP | 07-325657 A | 12/1995 |
| JP | 08-076910 A | 3/1996 |
| JP | 09-282077 A | 10/1997 |
| JP | 2000-112640 A | 4/2000 |
| JP | 2003-500759 A | 1/2003 |
| JP | 2004-213341 A | 7/2004 |
| JP | 2007-058844 A | 3/2007 |
| KR | 10-2007-0119094 A | 12/2007 |
| KR | 10-2008-0081411 A | 9/2008 |
| WO | WO 2007/116024 A1 | 10/2007 |
| WO | WO 2008/032661 A1 | 3/2008 |

\* cited by examiner

TOUCHPAD USING RESISTIVE ELECTRO-CONDUCTIVE FIBER AND INPUT DEVICE HAVING THE SAME

CROSS-REFERENCE TO RELATED APPLICATIONS

This application claims the priority of Korean Patent Application Nos. 10-2008-0122270 filed on Dec. 4, 2008 and 10-2009-0032258 filed on Apr. 14, 2009, in the Korean Intellectual Property Office, the disclosures of which are incorporated herein by reference.

BACKGROUND OF THE INVENTION

1. Field of the Invention

The present invention relates to a touchpad and an input device having the same, and more particularly, to a touchpad using a resistive electro-conductive fiber, which can be used for controlling a personal terminal such as a computer by receiving a user's input using a signal that represents a motion of the user detected by the resistive electro-conductive fiber in contact with the user's body part such as a finger, instead of using a separate input device such as a mouse, and an input device having the same.

2. Description of the Related Art

Recently, various computing devices and control systems have been in active use and their application fields have been expended. In particular, the use of computing devices and control systems, using various input signals, is being generalized. For example, the utility and application of computers were immediately and significantly expanded by the addition of a mouse as an input device to a personal computer of the related art, where previous information input had been dependant simply upon a keyboard. In this regard, the development of input methods, applicable to various environments, would contribute to the demand generation for new computing devices and control systems.

In particular, there may be a case where the use of a mouse, whenever necessary, is inconvenient in daily life. Therefore, the development of new input devices having high accessibility and convenience is expected to raise the possibility of creating renewed demand for existing computing and control devices.

SUMMARY OF THE INVENTION

An aspect of the present invention provides a touchpad using a resistive electro-conductive fiber, capable of simply receiving a user's input via clothing or the like without using a separate mouse, and an input device having the same.

According to an aspect of the present invention, there is provided a touchpad using resistive electro-conductive fibers, the touchpad including: a plurality of motion detectors each including a resistive electro-conductive fiber having a resistance value varied according to a change in length thereof, the change being caused by contact with a human body part, and a signal generator outputting a signal corresponding to the varied resistance value; and a signal analyzer analyzing the signal output from each of the motion detectors, and generating a motion signal representing a motion of the human body part in contact with the touchpad.

The resistive electro-conductive fiber may include an electro-conductive fiber and an elastic string, so that the resistive electro-conductive fiber, deformed by the contact, easily returns to an original shape and location after the contact is terminated.

The electro-conductive fiber may be a carbon fiber or a metal line, and the elastic string and the electro-conductive fiber may be twisted into a single string.

The touchpad may further include a contact part having one surface directly contacting the human body part and receiving the motion as an input, and the other surface contacting the resistive electro-conductive fiber, the contact part being deformed by the contact with the human body part.

The touchpad may further include an indicator indicating the motion signal from the signal analyzer in a way that is noticeable by an individual with senses. The touchpad may further include a signal transmitter transmitting the motion signal, output from the signal analyzer, to the outside of the touchpad.

According to another aspect of the present invention, there is provided an input device having a touchpad using resistive electro-conductive fibers, the input device including a touchpad sensing a contact condition of a user using a plurality of resistive electro-conductive fibers having a resistance value varied according to a change in length of the resistive electro-conductive fiber, the change being caused by contact with a human body part; and a pointer generator generating a pointer signal corresponding the contact condition of the user sensed by touchpad, and outputting the pointer signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
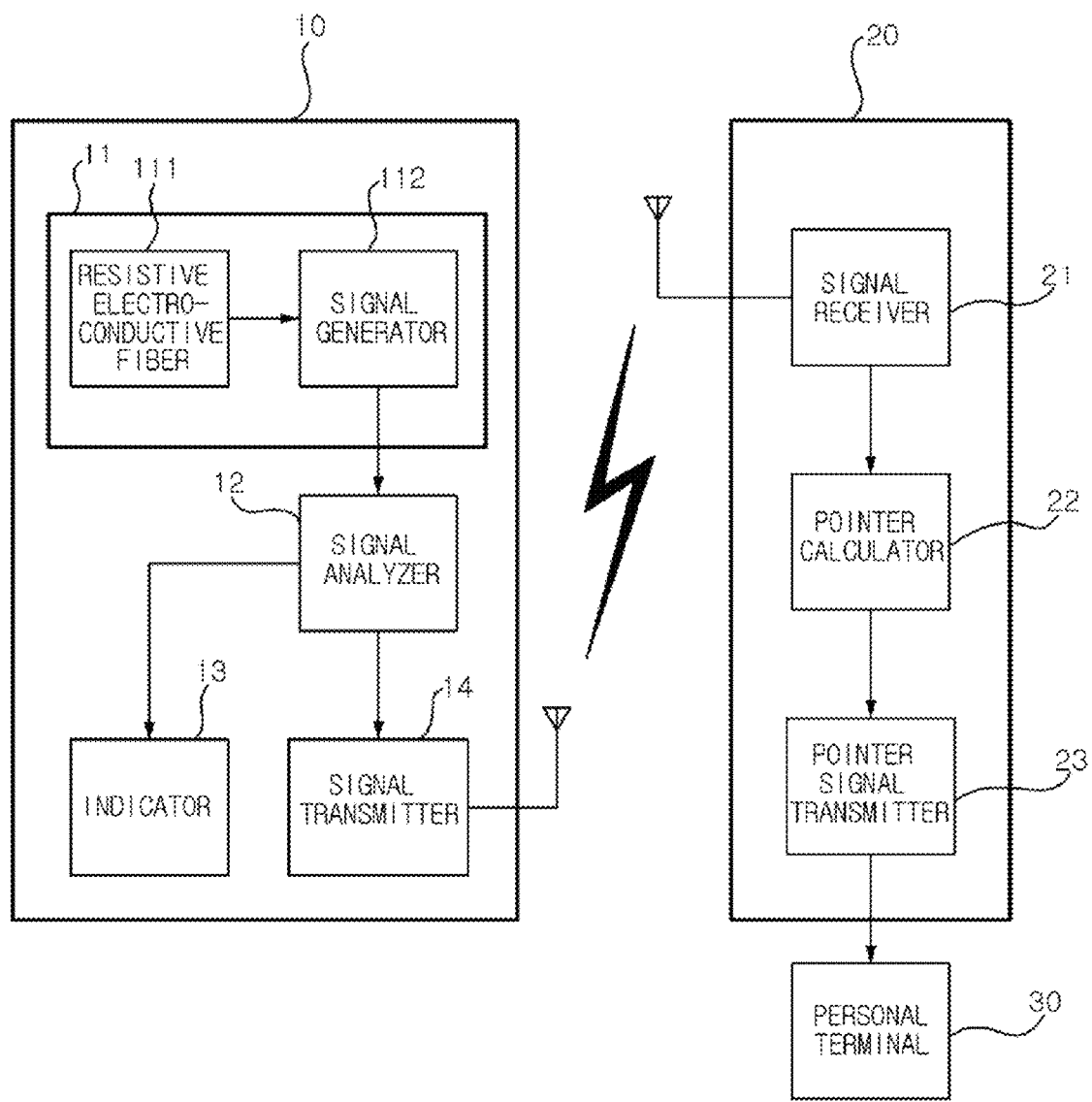
FIG. 1 is a block diagram illustrating a touchpad and an input device having the touchpad, according to an exemplary embodiment of the present invention.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and sizes of elements may be exaggerated for clarity.

FIG. 1 is a block diagram illustrating a touchpad and an input device having the touchpad according to an exemplary embodiment of the present invention.

As shown in FIG. 1, a touchpad 10 using resistive electro-conductive fibers, according to an exemplary embodiment of the present invention, may include a plurality of motion detectors 11, and a signal analyzer 12 collecting and analyzing signals output from the plurality of motion detectors 11.

Each of the motion detectors 11 includes a resistive electro-conductive fiber 111 having a resistance value varied according to a change in the length thereof caused by contact with a human body part, and a signal generator 112 outputting a signal corresponding to the resistance value varied according to the change in the length of the resistive electro-conductive fiber 111.

Figure 2A:
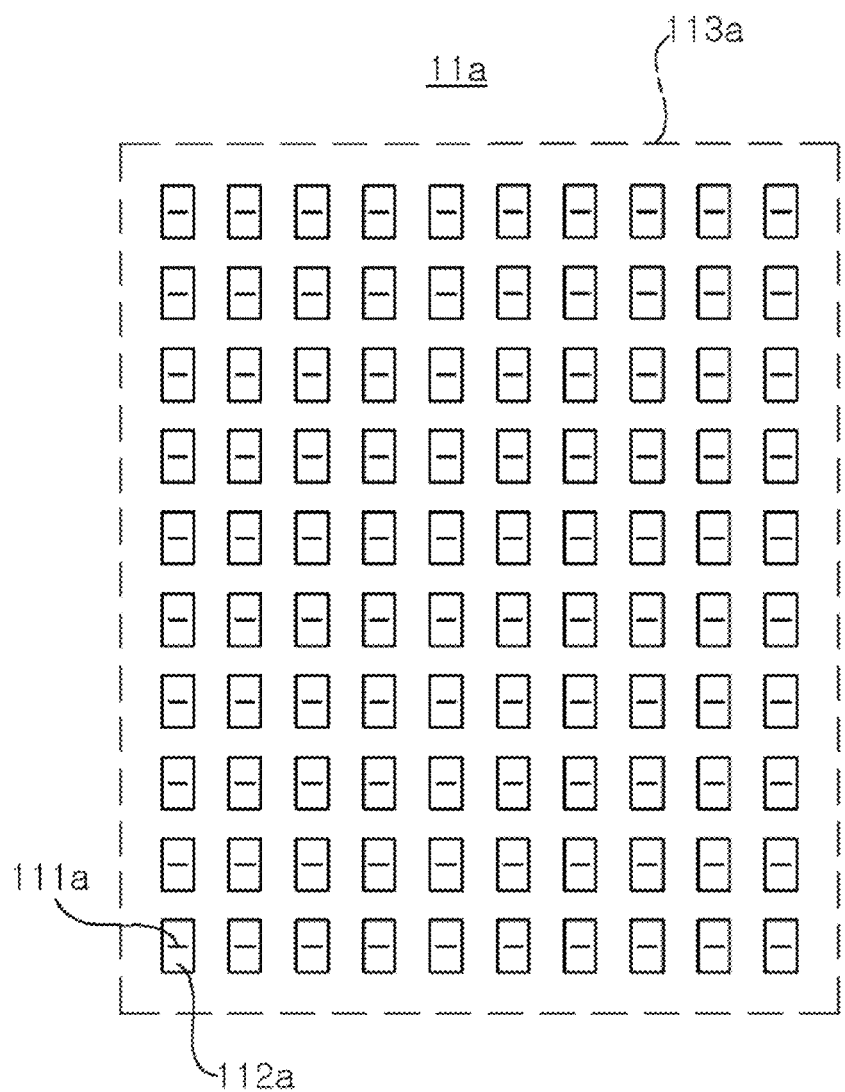
FIGS. 2A and 2B are a plan view and a side cross-sectional view illustrating a motion detector in the touchpad, according to an exemplary embodiment of the present invention, respectively.
Figure 2B:
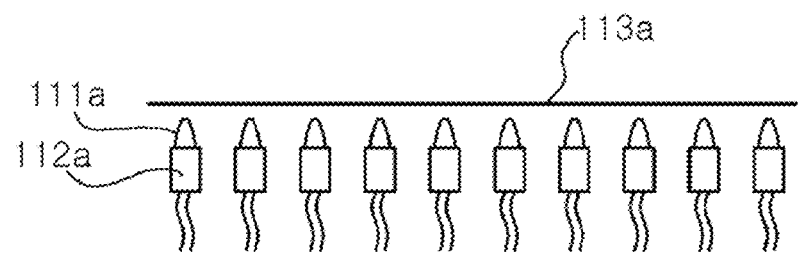

FIGS. 2A and 2B are a plan view and a side cross-sectional view illustrating a single motion detector in the touchpad, according to an exemplary embodiment of the present invention, respectively. In addition, FIGS. 4A and 4B are a plan view and a side cross-sectional view illustrating a motion detector in the touchpad, according to another exemplary embodiment of the present invention.

As in the embodiment illustrated in FIGS. 2A and 2B or 4A and 4B, the single motion detector 11a and 11b may include resistive electro-conductive fibers 111a and 111b arranged into preset formations. The motion detector 11a and 11b may further include a contact part 113a and 113b having one surface directly contacting a human body part and receiving the motion of the human body part as an input, and the other surface contacting the resistive electro-conductive fibers 111a and 111b. The contact parts 113a and 113b may utilize a textile material or a variety of film-type materials having flexibility and resilience.

Figure 3A:
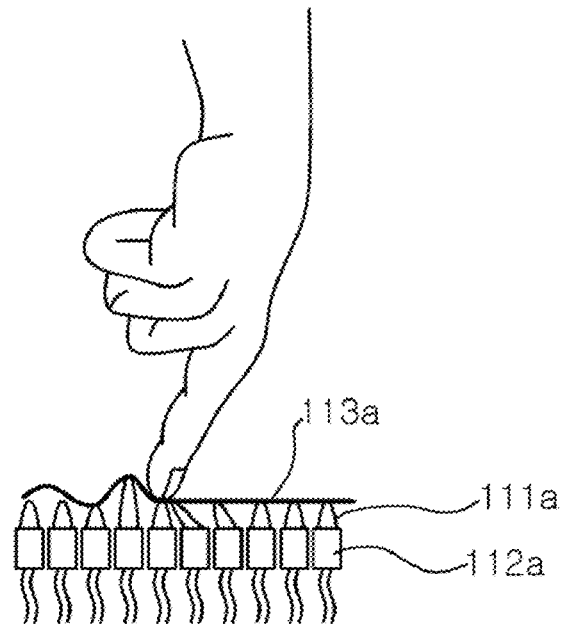
FIGS. 3A and 3B are views for explaining the operation of the motion detector of the touchpad illustrated in FIG. 2.
Figure 3B:
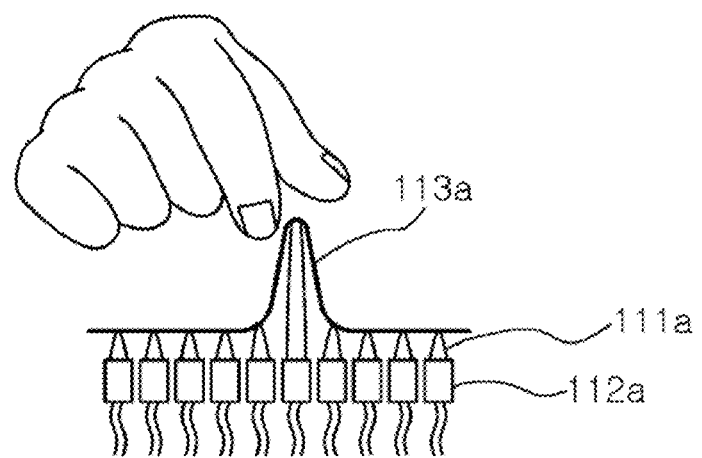

As in the embodiment illustrated in FIGS. 2A and 2B, the resistive electro-conductive fibers 111a of the motion detector 11a may be disposed adjacent to the contact part 113a with their longitudinal directions aligned with a direction perpendicular to the contact part 113a. As shown in FIGS. 3A and 3B, at least one of the resistive electro-conductive fibers 111a is changed in length by the contact, motion or pull of the body part (e.g., the finger) thereon, and then at least one corresponding signal generator 112a generates and outputs a signal corresponding to a resistance value varied by the change in the length of the at least one resistive electro-conductive fiber 111a.

Figure 4A:
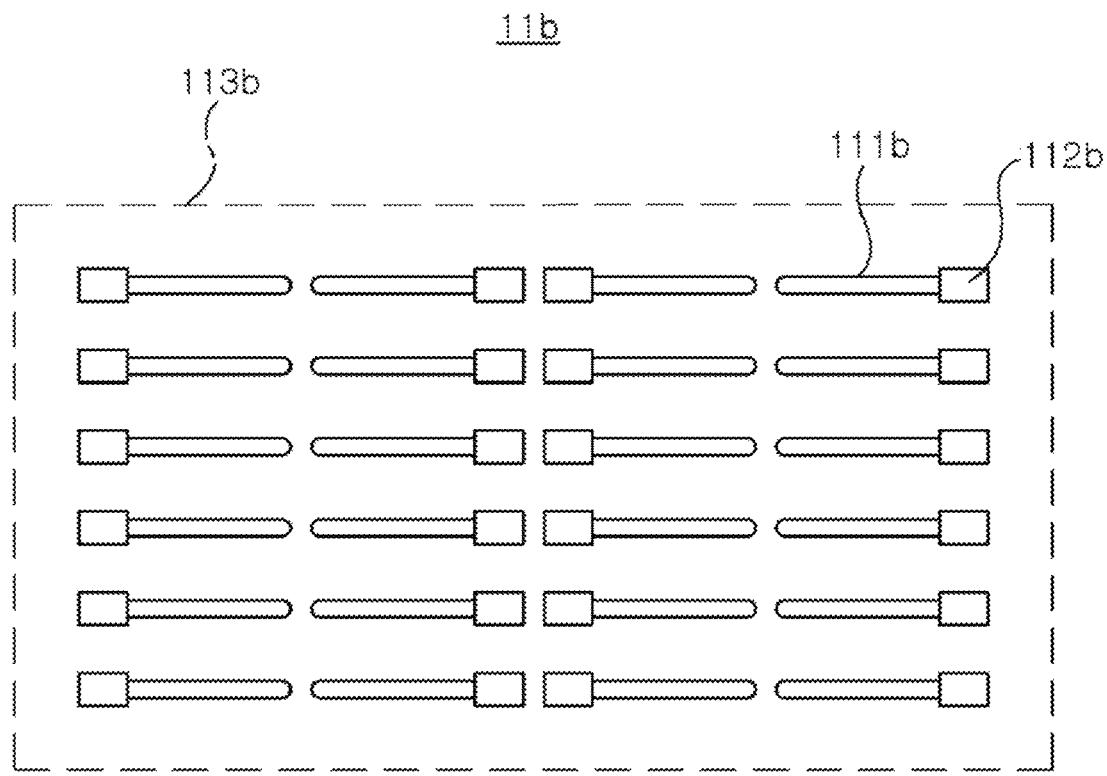
FIGS. 4A and 4B are a plan view and a side cross-sectional view illustrating a motion detector in the touchpad, according to another exemplary embodiment of the present invention.
Figure 4B:
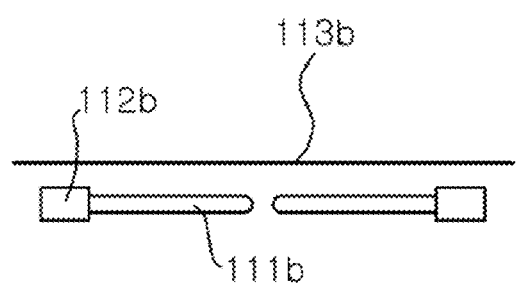
Figure 5A:
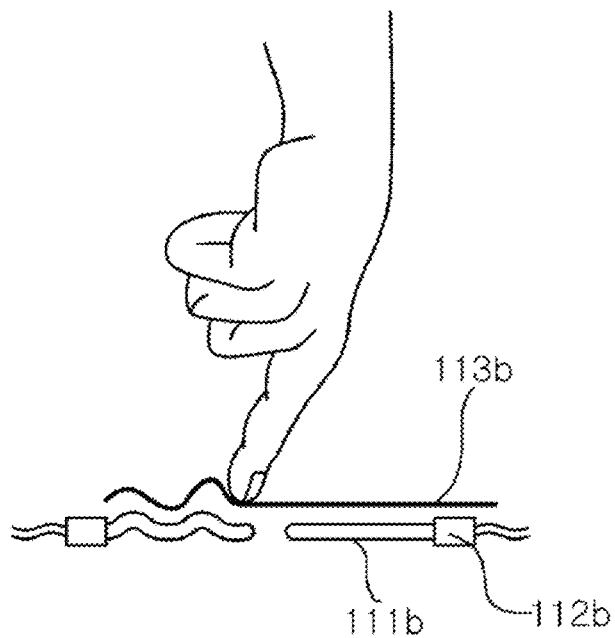
FIGS. 5A and 5B are views for explaining the operation of the motion detector of the touchpad illustrated in FIG. 4.
Figure 5B:
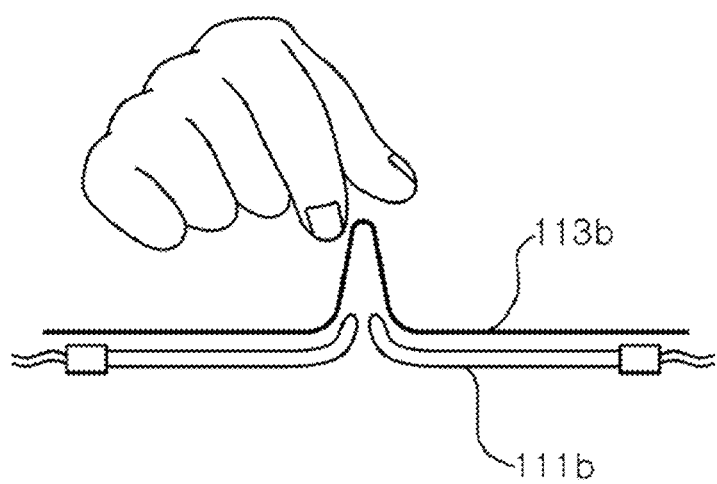

As in the embodiment illustrated in FIGS. 4A and 4B, the resistive electro-conductive fibers 111b may be disposed adjacent to the contact part 113b, with their longitudinal directions parallel to the contact part 113b. As shown in FIG. 5, at least one of the resistive electro-conductive fibers 111b is changed in length by the contact, motion or pull of the body part (e.g., the finger) thereon, and then at least one corresponding signal generator 112b generates and outputs a signal corresponding to a resistance value varied by the change in the length of the at least one resistive electro-conductive fiber 111b.

The resistive electro-conductive fibers 111a and 111b need to be deformed freely by contact with a human body part such as a finger, and quickly restore their original shapes when the contact no longer occurs. Therefore, the resistive electro-conductive fibers 111a and 111b may have flexibility and elasticity. To this end, the resistive electro-conductive fibers 111a and 111b may each be manufactured in the form of a thread containing an electro-conductive fiber and an elastic string. Here, the electro-conductive fiber may utilize a carbon fiber or a metal line, and the electro-conductive fiber and the elastic string may be combined into a single string using a variety of string producing methods such as twisting or spinning.

The signal generators 112, 112a and 112b generate and output signals that represent resistance values varied by the deformation of the resistive electric-conductive fibers 111, 111a and 111b connected to the signal generators 112, 112a and 112b, respectively.

Figure 6:
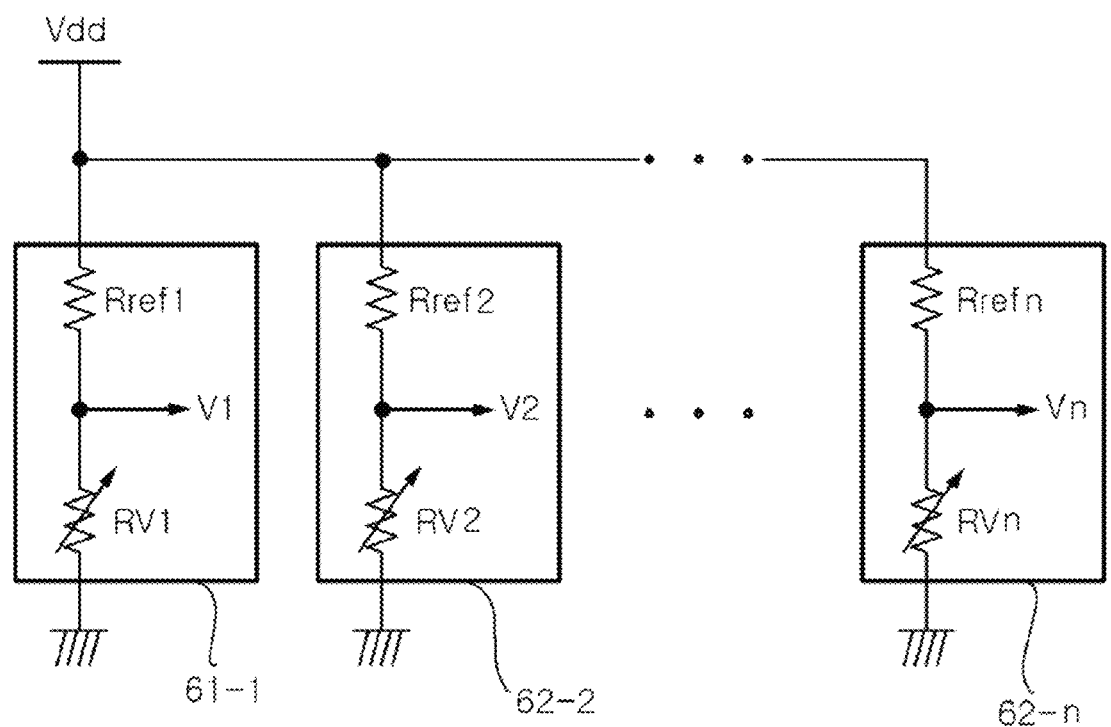
FIG. 6 is an equivalent circuit diagram for explaining the operation of a motion detector of a touchpad, according to an exemplary embodiment of the present invention.

FIG. 6 is an equivalent circuit diagram for explaining the operation of a motion detector of a touchpad according to an exemplary embodiment of the present invention.

According to an exemplary embodiment illustrated in FIG. 6, each of the signal generators 112, 112a and 112b may include voltage dividers 61-1 to 61-$n$ varying the division ratio of power voltage Vdd. A single voltage divider (e.g., 61-1) may include a reference resistor Rref1 connected in series to the power voltage Vdd, and a variable resistor Rv1 corresponding to a resistive electro-conductive fiber. When the variable resistor Rv1 of the resistive electro-conductive fiber 111, 111a or 111b is changed in resistance value due to contact with a human body part, such as a finger, a voltage being applied to the reference resistor Rref1 of the signal generator 112, 112a or 112b and the variable resistor Rv1 of the resistive electro-conductive fiber is changed in magnitude. This changes a voltage value V1 at the connection node between the reference resistor Rref1 and the variable resistor Rv1 of the resistive electro-conductive fiber.

Referring to FIG. 1 again, the signal analyzer 12 of the touchpad 10 collects and analyzes a signal corresponding to the varied resistance value of each resistive electro-conductive fiber, the signal being output from each of the motion detectors 11. For example, when the resistive electro-conductive fibers 111 have preset arrangements as shown in FIGS. 2A and 2B or 4A and 4B, the signal analyzer 12 may recognize the location at which the signal corresponding to a varied resistance value is generated, and this location analysis may allow the signal analyzer 12 to calculate the direction and amount of motion during contact. In addition, the signal analyzer 12 may analyze the pressure of body contact by analyzing the magnitude of the signal and calculating the degree to which the resistive electro-conductive fiber is deformed. Also, when there are preset input patterns (e.g., pressing twice in succession or pulling with two fingers), the signal analyzer 12 may recognize these preset input patterns. The signal analyzer 12 may generate and output a motion signal containing the aforementioned results of signal analysis, such as the direction and amount of motion during contact, the pressure of body contact, or whether or not the preset input patterns are input.

The touchpad 10, according to this embodiment of the present invention, may further include an indicator 13 indicating the motion signal from the signal analyzer 12 in a way that is noticeable by an individual with senses. For example, when a simple touch is made on the resistive electro-conductive fiber 111, the signal analyzer 12 outputs a motion signal representing the simple touch, and the indicator 13 indicates the input motion signal using a preset indication method, thereby informing a user of the occurrence of the simple touch. For example, the indicator 13 may be realized as a vibration motor. In this case, the indicator 13 may generate a short vibration when there is an input regarding the simple touch. For another example, the indicator 13 may be realized as a light emitting device. In this case, the indicator 13 may emit one blinking light to indicate the simple touch. For another example, the indicator 13 may be realized as a speaker and therefore output a short beep sound to indicate the simple touch.

The touchpad 10, according to this embodiment, may further include a signal transmitter 14 outputting the motion signal from the signal analyzer 12 to the outside of the touchpad 10. The signal transmitter 14 may utilize various wired/wireless communications schemes known in the field of communications technologies. For example, the signal transmitter 14 may employ communication schemes such as serial communications, Bluetooth communications, zigbee communications or mobile communications.

The touchpad 10, according to this embodiment, may be provided in clothing. For example, the touchpad 10 may be attached to the specific part of clothing by using an adhesive part. For another example, resistive electro-conductive fibers, applied to the touchpad 10 according to the present invention, may be used directly in weaving fabrics for cloths and thus be provided in clothing.

According to this embodiment, the touchpad configured and operating in the aforementioned manner may be applied to an input device such as a personal computer, a computing device or a control device. That is, the touchpad, according to this embodiment, may serve as a new input device substituting for a related art input device such as a mouse or a joystick.

As shown in FIG. 1, an input device employing the touchpad 10 according to this embodiment, may include the aforementioned touchpad 10, and a pointer generator 20 receiving a motion signal from the touchpad 10 and generating a pointer of the input device by analyzing the received motion signal.

The pointer generator 20 may include a signal receiver 21 receiving the motion signal transmitted from the signal transmitter 14 of the touchpad 10, a pointer calculator 22 calculating the operation of a pointer by analyzing the motion signal, and outputting a pointer signal corresponding to the calculated operation, and a pointer signal transmitter 23 transmitting the pointer signal output from the pointer calculator 22 to an external device using the pointer.

As described above, the touchpad using resistive electro-conductive fibers and the input device having the same can be easily combined with clothing, and have superior electrical characteristics due to the use of the resistive electro-conductive fibers. Also, the touchpad using resistive electro-conductive fibers and the input device having the same allow computing devices and control devices to be actively utilized in daily life by generating control signals based on changes in electrical signals corresponding to physical changes occurring at a location where the touchpad is attached.

As set forth above, according to exemplary embodiments of the invention, the touchpad using resistive electro-conductive fibers measures a motion signal regarding a touch of a body part (e.g., finger) in real time, and transmits electrical signals to external computing devices or control devices immediately or through wired/wireless communications. Accordingly, the computing devices or control devices can be easily regulated and controlled even in an environment where a mouse is hard to use.

While the present invention has been shown and described in connection with the exemplary embodiments, it will be apparent to those skilled in the art that modifications and variations can be made without departing from the spirit and scope of the invention as defined by the appended claims.

What is claimed is:

1. A touchpad using resistive electro-conductive fibers, the touchpad comprising:
    a plurality of motion detectors arranged in a two-dimensional array with a plurality of rows and columns, each of the motion detectors including:
    a resistive electro-conductive fiber having a resistance value that varies according to a change in length thereof, the change being caused by contact with a human body part; and
    a signal generator configured to output a signal corresponding to the varied resistance value, each of the resistive electro-conductive fibers having both free ends captured by the corresponding signal generator, thereby forming a loop; and
    a signal analyzer configured to analyze the signal output from each of the motion detectors, and to generate a motion signal representing a motion of the human body part in contact with the touchpad corresponding to coordinates in the two-dimensional array.

2. The touchpad of claim 1, wherein the resistive electro-conductive fiber comprises an electro-conductive fiber and an elastic string.

3. The touchpad of claim 2, wherein the electro-conductive fiber is a carbon fiber or a metal line.

4. The touchpad of claim 1, further comprising a flexible contact part having a first surface directly contacting the human body part and receiving the motion as an input, and a second surface contacting the resistive electro-conductive fiber, the contact part being deformed by the contact with the human body part.

5. The touchpad of claim 1, further comprising an indicator indicating the motion signal from the signal analyzer in a way that is noticeable by an individual with senses.

6. The touchpad of claim 1, further comprising a signal transmitter configured to transmit the motion signal, output from the signal analyzer, outside of the touchpad.

7. An input device having a touchpad using resistive electro-conductive fibers, the input device comprising:
    a touchpad including:
    a plurality of motion detectors arranged in a two-dimensional array with a plurality of rows and columns, each of the motion detectors including:
    a resistive electro-conductive fiber having a resistance value that varies according to a change in length thereof, the change being caused by contact with a human body part; and
    a signal generator configured to output a signal corresponding to the varied resistance value, each of the resistive electro-conductive fibers having both free ends captured by the corresponding signal generator, thereby forming a loop; and
    a pointer generator configured to generate a pointer signal corresponding to coordinates sensed by the touchpad, and to output the pointer signal.

8. The input device of claim 7, wherein the touchpad further comprises:
    a signal analyzer configured to analyze the signal output from each of the motion detectors, and to generate a motion signal representing a motion of the human body part in contact with the touchpad corresponding to a location in the Cartesian grid; and
    a signal transmitter configured to transmit the motion signal, output from the signal analyzer, outside of the touchpad.

9. The input device of claim 7, wherein the pointer generator comprises:
    a signal receiver configured to receive the motion signal transmitted from the signal transmitter;
    a pointer calculator configured to calculate an operation of a pointer by analyzing the motion signal, and to output a second pointer signal corresponding to the calculated operation; and
    a pointer signal transmitter configured to transmit the pointer signal, output from the pointer calculator, to an external device using the pointer.

10. The input device of claim 7, wherein the resistive electro-conductive fiber comprises an electro-conductive fiber and an elastic string.

11. The input device of claim 7, wherein the electro-conductive fiber is a carbon fiber or a metal line.

12. The input device of claim 7, further comprising a flexible contact part having a first surface directly contacting the human body part and receiving a motion as an input, and a second surface contacting the resistive electro-conductive fiber, the contact part being deformed by the contact with the human body part.

13. The input device of claim 7, further comprising an indicator indicating the motion signal from the signal analyzer in a way that is noticeable by an individual with senses.

\* \* \* \* \*